Feb. 19, 1946.  C. A. WYLIE  2,395,208
BABY CARRIAGE
Filed Oct. 19, 1942
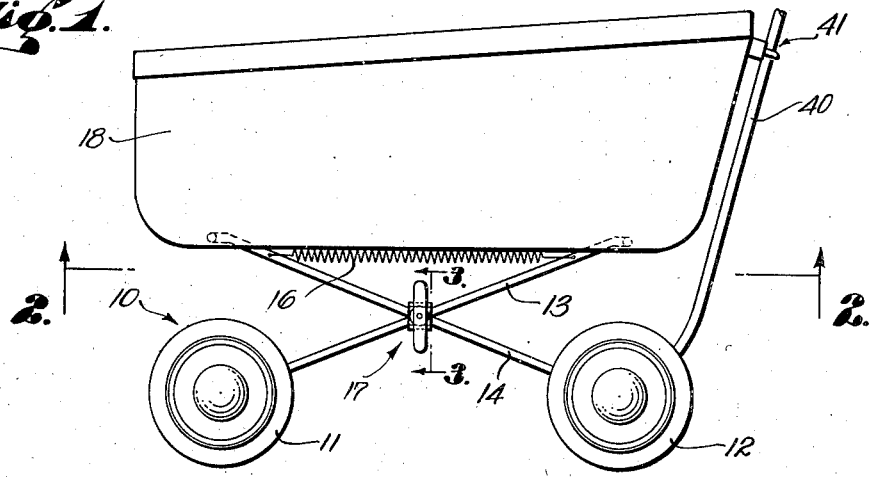
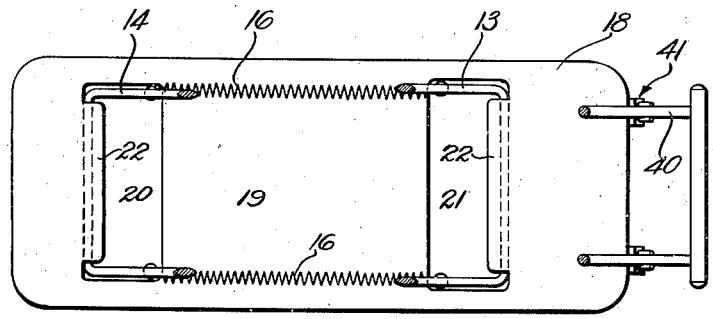
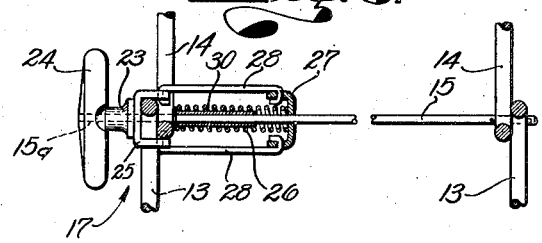
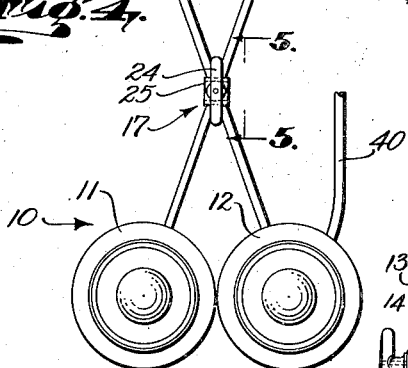
Inventor
CHARLES A. WYLIE
H. Calvin White
Attorney Patented Feb. 19, 1946

2,395,208

UNITED STATES PATENT OFFICE 2,395,208

BABY CARRIAGE

Charles A. Wylie, San Bernardino, Calif.

Application October 19, 1942, Serial No. 462,458

3 Claims. (Cl. 280—41)

This invention has to do generally with improvements in baby carriages, especially of the combination bassinet and carriage type, and is concerned particularly with improvements in the invention disclosed in Patent No. 2,191,005 issued February 20, 1940, to me on Combination bassinet and carriage.

The present type of carriage assembly may be described generally as comprising a carriage proper, including frame members interconnecting the rear pairs of wheels, the frame members being relatively movable to bring the wheel pairs together into what may be termed collapsed positions, and to spread the wheel pairs to normal or extended positions. One characteristic feature of novelty of the carriage structure shown in the patent referred to above is the capacity of the carriage to become operatively engaged with, and disengaged from the body or bassinet supported by the carriage simply by resting the bassinet upon and lifting it from the carriage. To operate in this manner, the carriage frame members attached to the wheels are pivotally interconnected between their upper and lower ends, and are yieldably restrained, as by interconnecting springs, against wheel-spreading movement, all in a manner such that with the bassinet removed, the carriage frame tends to assume a collapsed condition, from which the frame is distensible to thrust the top portions of the frame members into holding engagement with the bassinet, simply by resting the bassinet on the frame. Usually the spring tension will be adjusted so that the weight of both the bassinet and the infant will be required to distend the frame into holding engagement with the bassinet.

The principal object of the present invention is to prevent the automatic or self-acting tendency of the carriage frame to assume collapsed condition upon lifting or relieving the weight of the bassinet unless it then be desired to collapse the carriage. By this improvement, it becomes possible to retain the carriage in distended condition regardless of the magnitude of the load imposed on the carriage by the bassinet, and avoids accidental collapse of the carriage under various circumstances that might arise. In accordance with the invention, it becomes possible to manually control the collapsibility of the carriage, while retaining the desirable feature of rendering the carriage responsive in its wheel distending and collapsing movements, to the bassinet load placed on the carriage.

The details of a typical and preferred embodiment of the invention would be more clearly understood and explained to better advantage by reference to the accompanying drawing, in which:

Fig. 1 is a side elevation showing the carriage engaged with a conventionally illustrated bassinet or body;

Fig. 2 is a bottom view of the bassinet and carriage interlock, taken on line 2—2 of Fig. 1;

Fig. 3 is an enlarged fragmental view of the locking device taken from line 3—3 of Fig. 1;

Fig. 4 is a side elevation of the carriage in collapsed condition; and

Fig. 5 is a view illustrating the condition of the lock in released condition, a showing of the stop sleeve being omitted.

The carriage assembly, generally indicated at 10, comprises forward and rear pairs of wheels 11 and 12 interconnected by substantially U-shaped members 13 and 14, the lower ends of which are connected to the wheel axles, not shown. Members 13 and 14 may be suitably interconnected intermediate their upper and lower ends for relative pivotal movement, as by means of a rod 15, see Fig. 3, one end of which is extended beyond the frame members as indicated at 15a. The frame members are interconnected by coil springs 16, preferably above the pivot connection 15 and at normally concealed locations beneath the bassinet. Springs 16 tend to bring together the upper portions of the frame members 13 and 14, so that upon release of the lock 17 and removal of the bassinet from the carriage, the latter assumes, by the action of the springs, a collapsed condition shown in Fig. 4.

It will be understood that the invention is independent of any particular form and construction of the bassinet or of the type of body to be supported on the carriage. Merely as illustrative, I have shown a conventionally outlined body 18 suitable for removal from the carriage and for independent use as a bassinet. As best illustrated in Fig. 2, the bottom 19 of the bassinet contains spaced transverse recesses 20 and 21 adapted to receive the upper ends of the frame members 13 and 14. Assuming the carriage to be in the collapsed condition of Fig. 4 with the locking device 17 released from the engaged position of Fig. 3, the bassinet 18 and frame 10 may be interengaged simply by resting the bassinet on the upper ends of the frame members 13 and 14, causing them to become spread apart into the bassinet recesses 20 and 21. The bassinet is retained against upward movement from the frame in its distended condition, by projections or flanges 22 underlying the transverse ends of the frame parts.

Referring to Fig. 3, the locking device 17 comprises an element 23 slideable along the projected end 15a of the rod 15 and having an integral handle 24 by which the locking element may be pulled straight outwardly to released position. The locking element also has an integral U-shaped part or clevice 25 adapted to engage and straddle the frame members 13 and 14, as shown, to prevent their retraction from the normal expanded positions shown in Fig. 1. A coil spring 26 confined between member 14 and an annulus 27 connected to the clevice 25 by links 28, thrusts the locking element into retained engagement with the frame members. The lock is releasable by pulling the element 23 outward on rod 15a to a position at which the end of the clevice at the sides of link 28 may engage and be retained against the outer surface of member 13, as shown in Fig. 5, when members 13 and 14 are swung to collapsed position. Outward movement of the locking element and link assembly may be suitably limited as by the engagement of annulus 27 with a stop sleeve 30 placed about the rod 15.

In describing the operation of the carriage, assume the parts to be in the position of Fig. 4, with the locking device 17 released as illustrated in Fig. 5. As previously explained, the bassinet then may be engaged with the frame members simply by resting the bassinet on the carriage to thrust the members 13 and 14 into recesses 20 and 21. The lock 17 then may be turned to engage the frame members in the position of Fig. 3, preventing retraction or collapse of the frame, should the bassinet be lifted, from the interlocked condition of Fig. 1. When it is desired to remove the bassinet, the lock 17 may be released, permitting springs 16 to withdraw the frame members from the bassinet recesses 20 and 21, and return the frame to the collapsed condition of Fig. 4.

The invention is independent of any particular form, mounting or construction of handle for pushing the assembled bassinet and carriage. Merely as illustrative, I have shown fragmentarily a handle frame 40 applied to the rear wheel axle by suitable means (not shown) and having a releasable connection at 41 with the bassinet body.

The drawing is to be regarded merely as illustrative of the invention and one of its typical and preferred forms, and it is understood that various changes and modifications may be made wtihout departure from the invention and its intended spirit and scope.

I claim:

1. The combination comprising a carriage including forward and rear pairs of wheels, relatively movable frame members interconnecting the wheels so that said wheel pairs are movable together to collapsed positions and movable apart to distended positions, a pivotal connection between said members intermediate their upper and lower ends, a spring interconnecting said members and resisting their movement to wheel distending positions, a releasable bifurcated locking element normally engaging and straddling said members at their pivotal connection to hold said members against movement from wheel distending positions, and a spring resisting releasing movement of said locking element.

2. The combination comprising a carriage including forward and rear pairs of wheels, relatively movable substantially U-shaped frame members interconnecting the wheels so that said wheel pairs are movable together to collapsed positions and movable apart to distended positions, a rod pivotally connecting said members intermediate their upper and lower ends, a spring acting to move said members to wheel collapsing positions, and locking means carried by said rod and movable axially thereof, said locking means being operable by virtue of such axial movement to releasably lock said members against movement from wheel distending positions.

3. The combination comprising a carriage including forward and rear pairs of wheels, relatively movable substantially U-shaped frame members interconnecting the wheels so that said wheel pairs are movable together to collapsed positions and movable apart to distended positions, a rod pivotally connecting said members intermediate their upper and lower ends, a spring acting to move said members to wheel collapsing positions, and locking means carried by said rod and acting to releasably lock said members against movement from wheel distending positions, said locking means comprising an element engaging said members to hold them in locked condition and releasable by movement along said rod, and a spring resisting such releasing movement of said element.

CHARLES A. WYLIE.